(12) United States Patent
Scherer et al.

(10) Patent No.: US 7,775,447 B2
(45) Date of Patent: Aug. 17, 2010

(54) METHOD FOR CONTROLLING THE TEMPERATURE OF FEED AIR INJECTED INTO THE CABIN ZONE OF A PASSENGER AIRCRAFT

(75) Inventors: Thomas Scherer, Hamburg (DE); Michael Markwart, Halstenbek (DE); Torsten Schwan, Pinneberg (DE)

(73) Assignee: Airbus Deutschland GmbH, Hamburg (DE)

( * ) Notice: Subject to any disclaimer, the term of this patent is extended or adjusted under 35 U.S.C. 154(b) by 875 days.

(21) Appl. No.: 10/582,595

(22) PCT Filed: Dec. 30, 2004

(86) PCT No.: PCT/EP2004/014862

§ 371 (c)(1),
(2), (4) Date: Jun. 9, 2006

(87) PCT Pub. No.: WO2005/063578

PCT Pub. Date: Jul. 14, 2005

(65) Prior Publication Data

US 2007/0144726 A1  Jun. 28, 2007

(30) Foreign Application Priority Data

Dec. 30, 2003  (DE) ................... 103 61 721

(51) Int. Cl.
*F24F 11/00* (2006.01)
*B60H 1/00* (2006.01)
*F24F 3/00* (2006.01)

(52) U.S. Cl. ............... 236/1 B; 236/1 C; 62/DIG. 5; 165/203; 165/205

(58) Field of Classification Search ............. 236/1 B, 236/1 C; 165/203, 205; 62/DIG. 5
See application file for complete search history.

(56) References Cited

U.S. PATENT DOCUMENTS 1,921,172 A * 8/1933 Taylor et al. ............. 236/74 R

FOREIGN PATENT DOCUMENTS

DE        4308466 C1    8/1994

OTHER PUBLICATIONS

Sheng Leshan,"The Basic Relationships Between the Air-Conditioning Pack and the Temperature Control Software on Aircraft," Journal of Civil Aviation University of China, vol. 17, No. 1, Feb. 1999, pp. 29-33.
English Translation of Decision on Granting A Patent for Invention, Russian Patent Office, Mar. 27, 2009.

*Primary Examiner*—Frantz F Jules
*Assistant Examiner*—Alexis K Cox
(74) *Attorney, Agent, or Firm*—Wood, Herron & Evans, L.L.P.

(57) ABSTRACT

With a method for controlling the temperature of feed air which is injected into the cabin zone of a passenger aircraft, the cabin of which is sub-divided into several cabin zones supplied respectively with specially temperature-controlled feed air, the temperature of the injected feed air is controlled for each cabin zone, dependent upon the deviation of an injection temperature actual value for the feed air injected into the cabin zone in question, measured by sensors, in relation to an injection temperature optimum value. If there is no, or at least no usable reading of the ambient temperature of this cabin zone for a cabin zone, an optimum value for the injection temperature of this cabin zone can be established in accordance with a variation, whereby it is determined upon the basis of the injection temperature optimum values and/or the injection temperature actual values of other cabin zones, whereby the measurement by sensors of the cabin temperature works reliably. In accordance with another variation, the injection temperature optimum value of a cabin zone can be established without measuring ambient temperature by sensors or without reliably measuring ambient temperature from the temperature measured for the external surrounds of the aircraft.

5 Claims, 4 Drawing Sheets

U.S. PATENT DOCUMENTS

Figure 1:
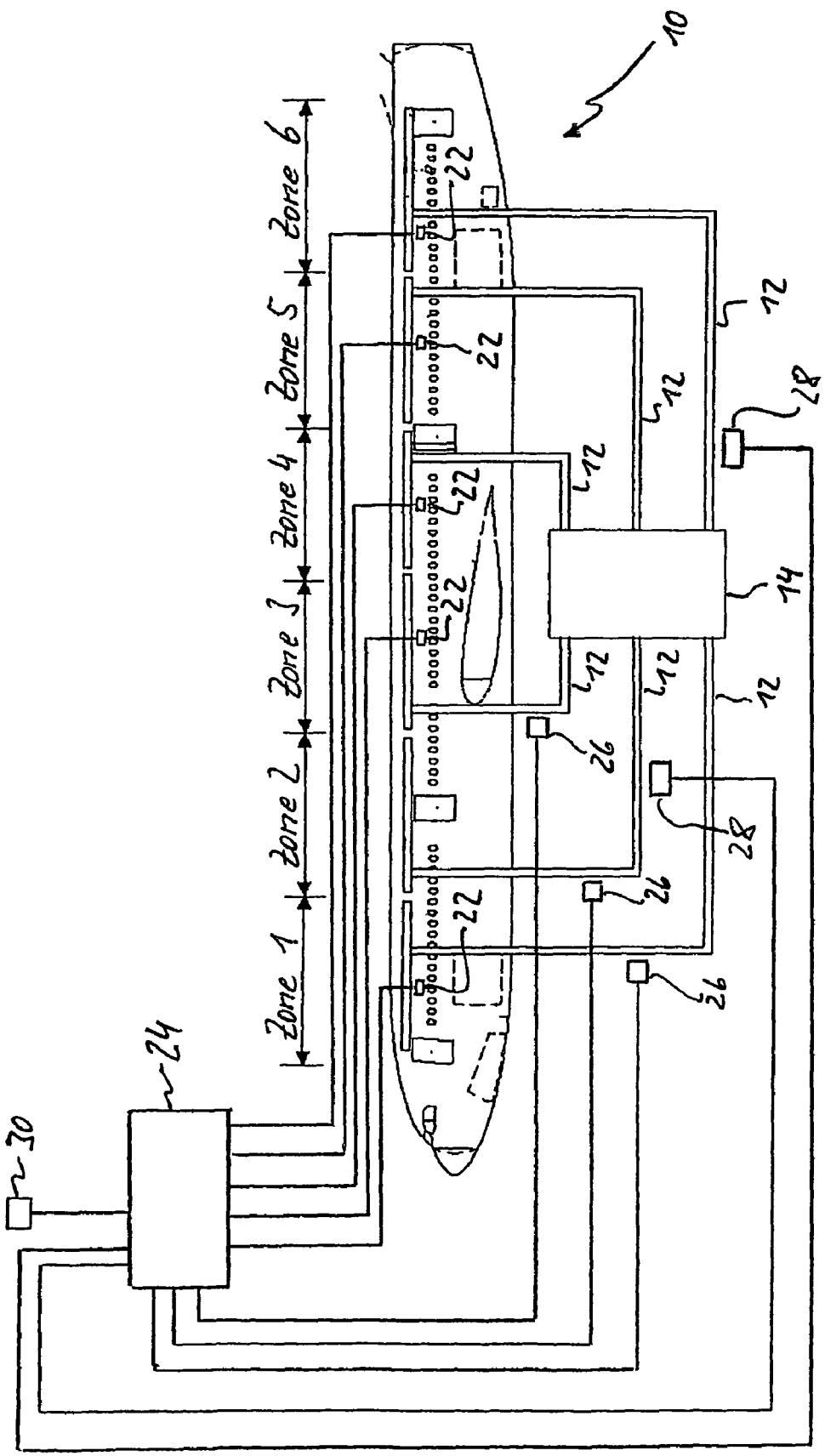

| | | | |
|---|---|---|---|
| 3,643,862 A * | 2/1972 | Byrne | 236/1 C |
| 3,711,044 A | 1/1973 | Matulich | |
| 3,861,624 A | 1/1975 | Lear | |
| 5,419,489 A * | 5/1995 | Burd | 236/47 |
| 5,479,983 A | 1/1996 | Fischer et al. | |
| 6,009,939 A * | 1/2000 | Nakanishi et al. | 165/209 |
| 6,012,515 A | 1/2000 | Stubbendorff et al. | |
| 6,439,468 B1 | 8/2002 | Lambert et al. | |
| 6,834,512 B2 * | 12/2004 | Bash et al. | 62/180 |
| 7,539,559 B2 * | 5/2009 | Kanai et al. | 700/277 |
| 7,540,321 B2 * | 6/2009 | Simmet et al. | 165/203 |
| 2004/0079099 A1 * | 4/2004 | Kumada et al. | 62/244 |
| 2005/0217841 A1 * | 10/2005 | Van Den Ende et al. | 165/287 |
| 2006/0064257 A1 * | 3/2006 | Pennington et al. | 702/50 |

FOREIGN PATENT DOCUMENTS

| | | | |
|---|---|---|---|
| GB | 1383705 | | 2/1975 |
| JP | 8121845 A | * | 5/1996 |
| JP | 9123731 A | * | 5/1997 |
| JP | 09123731 A | * | 5/1997 |
| JP | 2006335116 A | * | 12/2006 |
| JP | 2008190784 A | * | 8/2008 |
| JP | 2009257617 A | * | 11/2009 |
| SU | 304186 | | 3/2009 |

OTHER PUBLICATIONS

Forms PCT/ISA/210, 220, 237 International Search Report for PCT/EP2004/014862, mailed on May 4, 2005.

* cited by examiner

METHOD FOR CONTROLLING THE TEMPERATURE OF FEED AIR INJECTED INTO THE CABIN ZONE OF A PASSENGER AIRCRAFT

The invention relates to the control of the feed air temperature of a passenger aircraft. When reference is made to 'control' in this context, limitation to true control systems is in no way intended whereby a desired value is set directly by means of a controlled system without a feedback loop. Quite on the contrary, the term 'control' within the framework of the invention also encompasses regulation whereby a regulatory difference is determined by comparing an optimum value with a recorded actual value and this is entered into a regulator.

A cabin with good temperature maintenance is important in order to offer passengers a pleasant flight. In modern passenger aircraft, the cabin temperature is regulated by means of the temperature of the feed air which is injected into the cabin.

It is established practice to sub-divide the cabin of a passenger aircraft into several cabin zones and to supply each cabin zone with air from its own supply line. For this, each cabin zone has its own temperature regulation circuit which regulates the temperature of the feed air in the cabin zone in question in such a way that the ambient temperature in the cabin zone has a required optimum value. In this way, the ambient temperature for each cabin zone can be specially regulated to a target value.

Previously, a single, discrete temperature sensor was generally used for each cabin zone, and this recorded the ambient temperature in the cabin zone in question. A control unit compares the ambient temperature value measured with an optimum value. From the difference between the two ambient temperature values, an optimum value for the injection temperature is arrived at, ie. for the temperature of the air injected into the cabin zone in question. The control unit compares this optimum value with a value measured for injection temperature. Dependent upon the difference between the actual injection temperature and the optimum injection temperature, the control unit produces control signals for one or more components by means of which the temperature of the feed air injected into the cabin zone in question is influenced.

The ambient temperature in the cabin can be subject to relatively strong fluctuations which are localised and periodic. It can arise therefore that the planned location for installation of the temperature sensor in a cabin zone can not give representative readings because the location is in the area of a local temperature peak (upwards or downwards). The "falsified" signal of a sensor in such a location would then lead to the injected air being either too hot or too cold. This reduces comfort when flying. Individual adaptation of the locations of the temperature sensors is not generally, however, taken into consideration because this, in so far as is possible considering the small amount of space within the cabin, would be associated with an inordinately high cost. In other cases, there is no space at all for a temperature sensor because it is prevented by cabin installations such as, for example, an on-board kitchen.

Occasionally, for this reason, there is no or no proven actual ambient temperature value available for a cabin zone. The aim of the invention is to indicate ways in which, even in such cases, a pleasant atmosphere can be created in the cabin zone in question.

In order to solve this problem, the invention takes up from a first aspect of a method for controlling the temperature of feed air which is injected into a cabin zone of a passenger aircraft, whereby the aircraft cabin is sub-divided into several cabin zones which are each supplied with specific temperature-controlled feed air, whereby with this method, the temperature of the feed air injected into each cabin zone is controlled, dependent upon the deviation of an injection temperature actual value measured by sensors for the feed air injected into the cabin zone in question in relation to an injection temperature optimum value, whereby for part of the cabin zones the injection temperature optimum value is maintained by comparing an ambient temperature actual value for the ambient temperature measured by sensors in the cabin zone in question with an ambient temperature optimum value.

In accordance with the invention it is proposed that, for at least a first cabin zone, the injection temperature optimum value for this first cabin zone is established upon the basis of the injection temperature optimum value and/or the injection temperature actual value of at least a second cabin zone which is different from the first, whereby every second cabin zone is a zone with sensor measurements of the ambient temperature actual value of the second cabin zone in question.

The invention to solve the above problem takes up from a second aspect of a method for control of the temperature of feed air which is injected into the cabin zone of a passenger aircraft, whereby the aircraft cabin is sub-divided into several cabin zones which is each supplied with specific temperature-controlled feed air, whereby with the method, the temperature of the feed air injected into each cabin zone is dependent upon the deviation of an injection temperature actual value, measured by sensors, of the feed air injected into the cabin zone in question in relation to an injection temperature optimum value.

In accordance with the invention, it is proposed here that, for at least one cabin zone, the injected temperature optimum value of this cabin zone is established upon the basis of a temperature of the external surrounds of the aircraft, measured by sensors.

The invention makes it possible to maintain an injection temperature optimum value for a cabin zone, even if no, or at least no representative actual value of the ambient temperature can be determined for this cabin zone, and accordingly, no optimum/actual value comparison of ambient temperature can be carried out for this cabin zone.

In accordance with the first aspect, reference is made back to the optimum value and/or the actual value of the injection temperature of at least one other (second) cabin zone, whereby it is presumed that the ambient temperature measurement taken by sensors is working correctly and provides usable measurement results. Preferably, reference is made back here to the injection temperature optimum values and/or the injection temperature actual values of several cabin zones, in particular every second cabin zone. The injection temperature values of these cabin zones can be determined so that the effect of any local temperature interference in the second cabin zones is limited. The average injection temperature (optimum or actual value) reflects the global external temperature conditions.

In accordance with the second aspect, the external temperature (ie. the temperature outside of the aircraft) is directly used as a parameter in order to determine an optimum value for the injection temperature. It has been shown that a connection can be found between the external temperature, the ambient temperature and the injection temperature, which assigns a specific value for injection temperature to a specific value for external temperature, so that a specific ambient temperature can be set. This connection can, for example, be determined empirically by practical tests and/or simulation and be described by a reference field, a table or a mathematical formula. Other parameters can be considered, for example the flight altitude.

Determination of the injection temperature optimum value can be realised in all cabin zones with reference to the external temperature, even if ambient temperature reading interference is to be reckoned with for all cabin zones. It is, of course, also possible to apply this method to just one part of the cabin zones. It may be necessary to determine the connection between external temperature, ambient temperature and injection temperature specifically for different cabin zones. It is, of course, equally possible to determined this connection uniformly for several or even all cabin zones.

Because different cabin zones can have different heat requirements, whether due to zone-specific factors or due to different temperature readings for ambient temperature, with both aspects at least one correction value can be taken into consideration when establishing the injection temperature optimum value, in accordance with a preferred version.

A first correction value can be specified for the cabin zone in question so that the zone-specific factors mentioned can be taken into account. The heat requirement of a cabin zone can, for example, depend upon the lay-out of the cabin zone with installations such as seats, toilets and on-board kitchens. The size of the window surfaces can also have an effect upon the heat requirement. The first correction value makes it possible to adapt to this type of zone-specific factor.

A second correction value can be dependent upon an ambient temperature optimum value entered manually for this cabin zone. In this way adaptation is possible if the required ambient temperature for the cabin zone in question can be entered individually.

Figure 2:
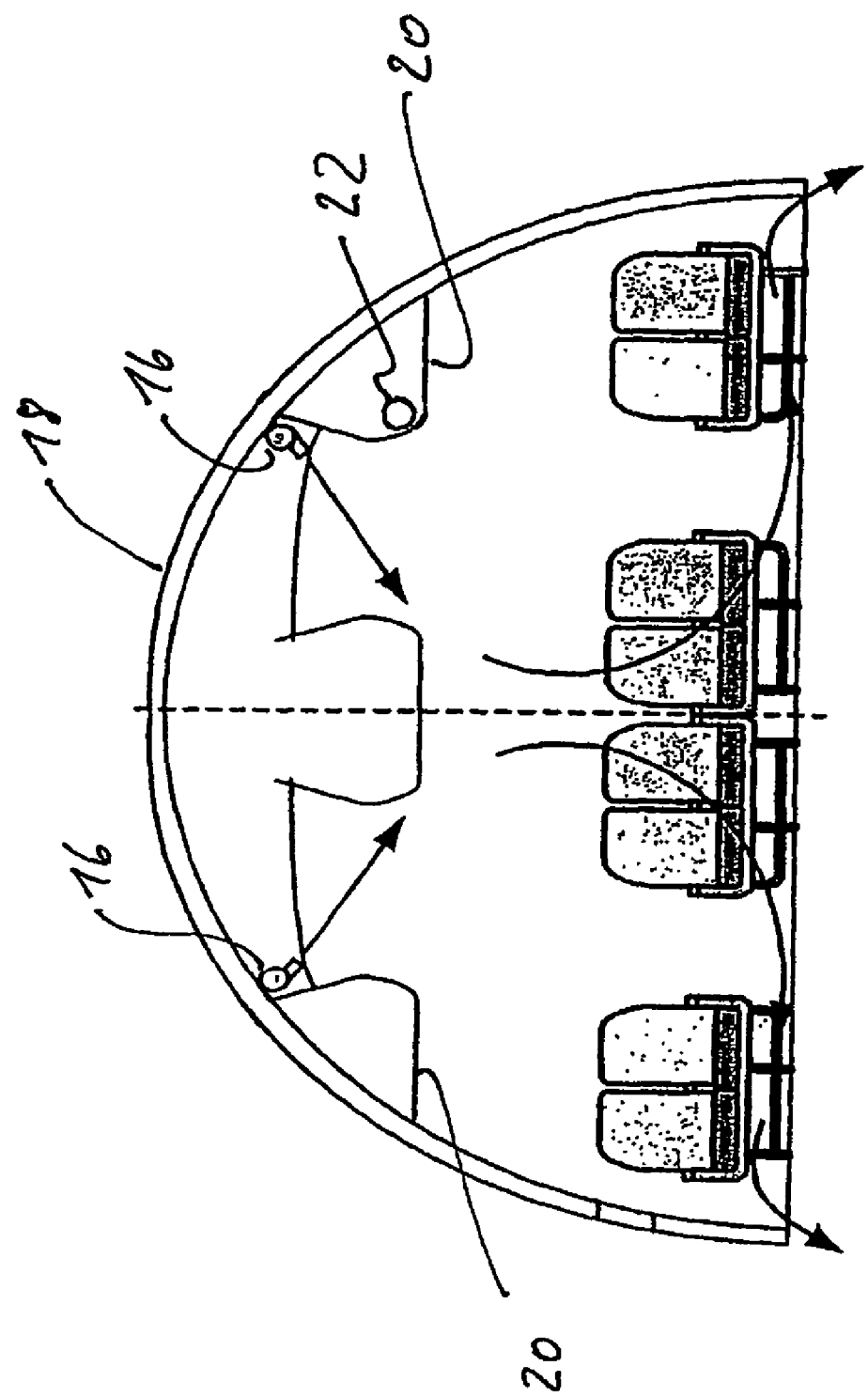
Figure 3:
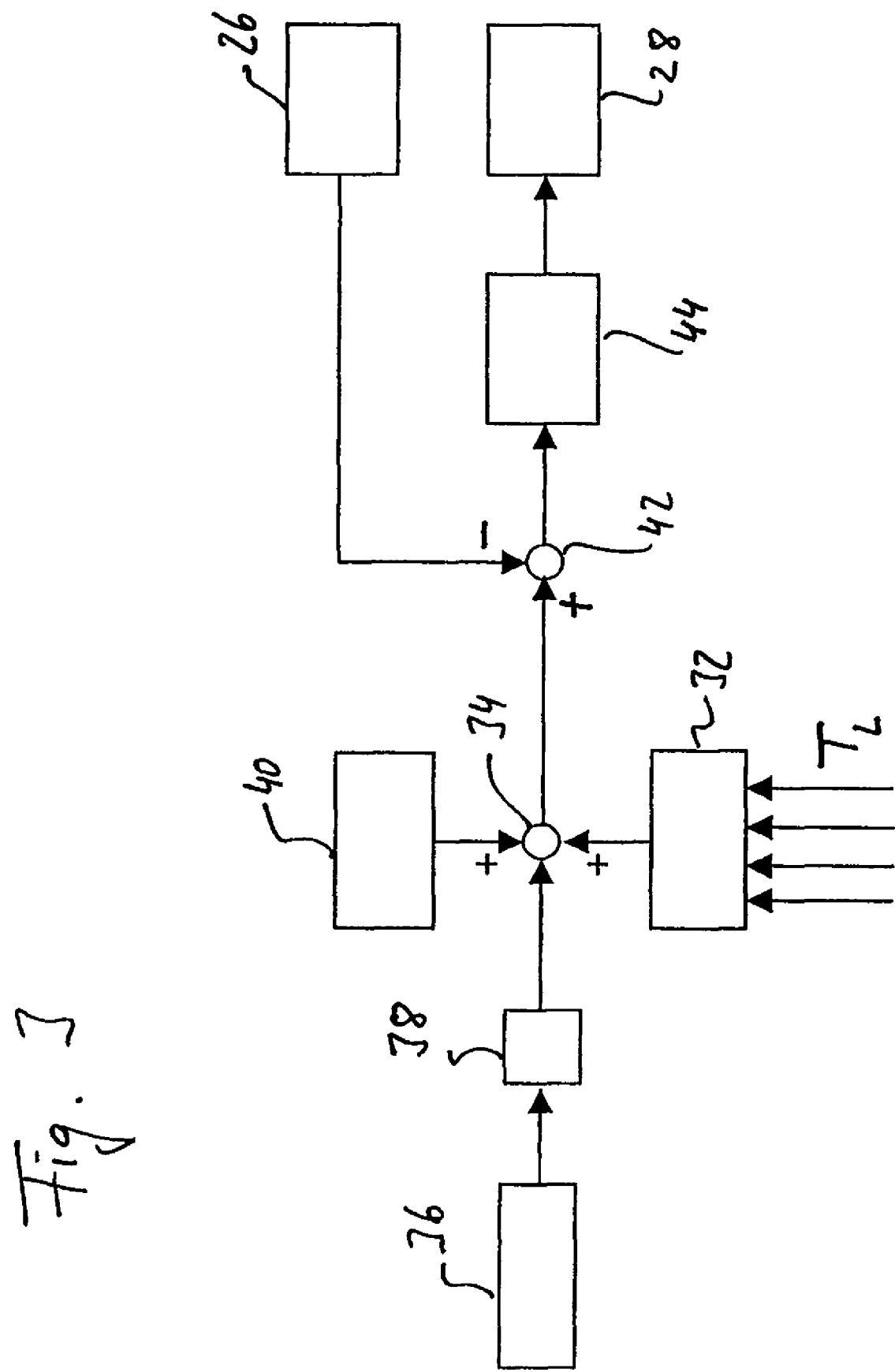
Figure 4:
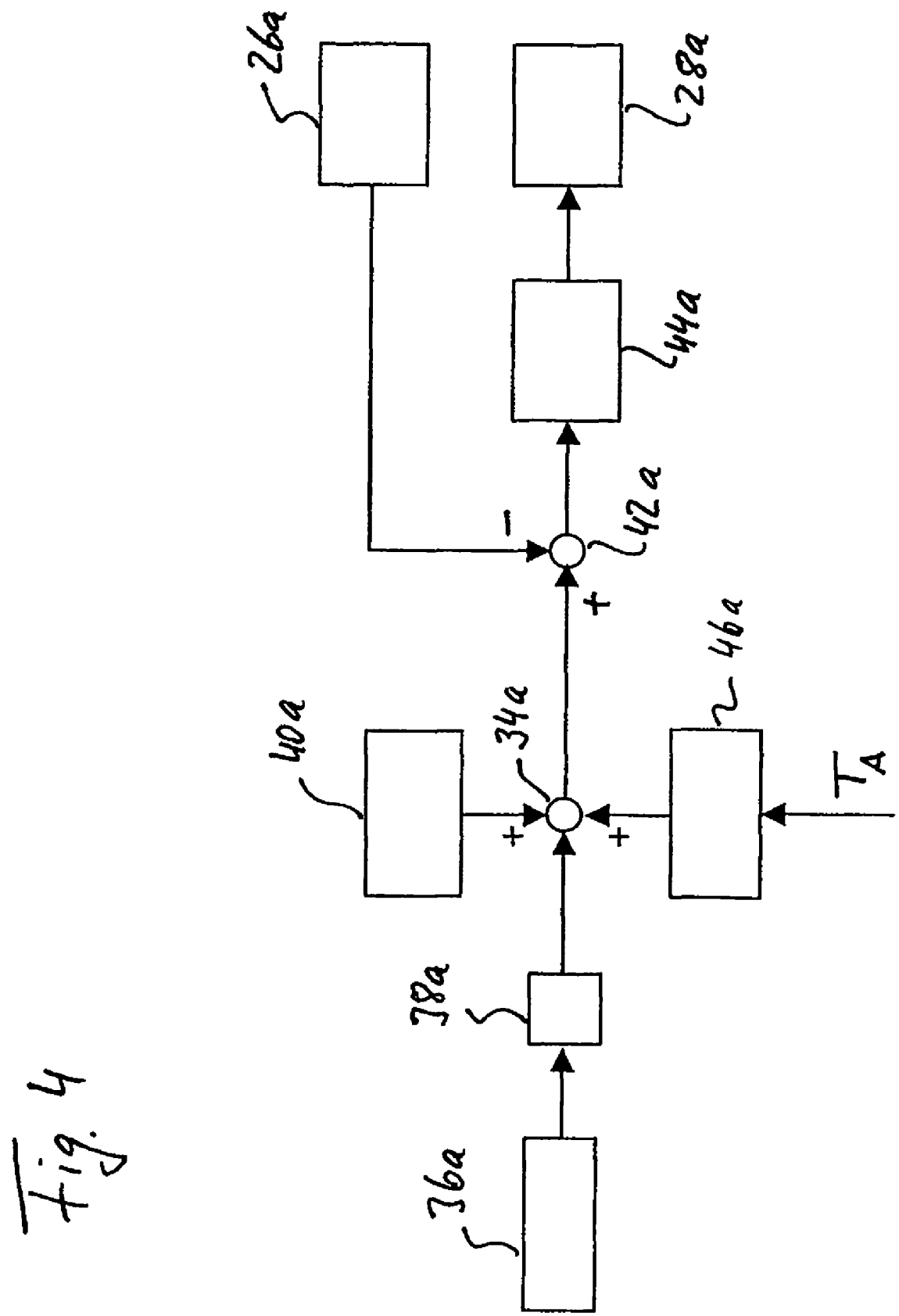

In the following, the invention is described in greater detail with reference to the attached drawings:

FIG. 1 schematically shows an example of a passenger aircraft with components for temperature-regulated air supply to the cabin of the aircraft, FIG. 2 schematically shows a cross-sectional view of the cabin, FIG. 3 shows a block diagram of a first example of a regulation circuit for the regulation of the feed air temperature of a cabin zone of the aircraft from FIG. 1 and FIG. 4 shows a block diagram of a second example of a regulation circuit for the regulation of the feed air temperature of a cabin zone of the aircraft from FIG. 1.

In FIG. 1, 10 identifies a passenger aircraft the cabin of which is sub-divided into several cabin zones following on from one another along the length of the aircraft 10. The cabin is here shown as the interior of the aircraft 10 in which the passengers and the flight crew are located. In the example illustrated by FIG. 1 the cabin of the aircraft 10 is sub-divided into six zones, the position and extent of which are marked by arrows in FIG. 1. The term cabin zone here means an area of the cabin to which an individual temperature regulation circuit for the regulation of the temperature of feed air is assigned, which is injected into the cabin zone in question. The cabin zones can therefore also be identified as temperature regulation zones.

A main supply line 12 is assigned to each cabin zone, and the cabin zone in question is supplied with feed air via this line. In accordance with the number of cabin zones, six main supply lines 12 are provided in the example shown by FIG. 1. The main supply lines are connected to a mixing chamber 14 from which they are supplied with feed air. The air supplied from each main supply line 12 is driven into the cabin zone in question via a system of air outlets 16 (FIG. 2) in the cabin area. Arrows in FIG. 2 schematically illustrate the flow direction of the air being injected into the cabin area. One can see that the feed air is typically injected in the upper section of the cabin, identified by 18 in FIG. 2, for example close to the storage lockers 20 for hand luggage. The feed air flows through the seating area in which the passengers sit and is expelled to the side at floor level in the cabin 18.

The temperature of the injected feed air determines the ambient temperature in the cabin 18. In order to create a pleasant ambient atmosphere in the cabin 18, the temperature of the feed air for each cabin zone is regulated in such a way that the ambient temperature in the cabin zone in question has a desirable target value. A temperature sensor system is provided here which makes it possible to determine one or more temperature values for each cabin zone. In the example illustrated by FIG. 1, the temperature sensor system includes a temperature sensor 22 for each cabin zone. In general, it is attempted to fit each cabin zone with a temperature sensor 22. Occasionally, however, the structural factors prevent temperature sensors 22 from being installed in all cabin zones. In other cases it can be that a cabin zone is fitted with a temperature sensor 22, but that this sensor does not provide any usable readings, for example because the temperature distribution in the cabin zone in question shows a localised peak at the location of this sensor, or because the temperature at the location of the sensor is periodically subjected to strong fluctuations. The situation whereby no or at least no usable temperature readings can be obtained for a cabin zone in the cabin zone in question, is illustrated by FIG. 1 with reference to cabin zone 2 where there is no temperature sensor 22.

The temperature sensors 22 are connected to an electronic evaluation and control unit 24 which regulates the temperature of the feed air injected into every cabin zone. The evaluation and control unit 26 is provided here with appropriate software and/or hardware. At least for those cabin zones for which they obtain usable actual ambient temperature readings, the evaluation and control unit 24 compares the ambient temperature actual value of the cabin zone in question with a specified ambient temperature optimum value, and establishes the difference between both values.

With reference to this difference, the evaluation and control unit 24 determines an optimum value for the temperature of the feed air injected into the cabin zone in question. In so doing, the evaluation and control unit 24 acts as a regulator which establishes the difference between the ambient temperature actual value and the ambient temperature optimum value as a regulatory difference.

The evaluation and control unit 24 then compares the optimum value determined for the feed air temperature with the current temperature value of the feed air injected into the cabin zone in question. This current value is provided by a temperature sensor 26 which measures the temperature of the air in the main supply line 12 to the cabin zone in question. In FIG. 1, a temperature sensor 26 of this type is only drawn for the supply lines 12 to cabin zones 1, 2 and 3. It is clear that a such a sensor 26 is also assigned to the supply lines 12 to the other cabin zones 4, 5 and 6.

The evaluation and control unit 24 determines a difference from the optimum value for the feed air temperature and the current value. This difference is converted by the evaluation and control unit 24 into positioning signals for one or more components, by means of which the temperature of the injected feed air is effected. The evaluation and control unit 24 works here again as a regulator which establishes the difference between the optimum value for the feed air temperature and the current value as a regulatory difference. FIG. 1 shows positioning components 28 assigned to the supply lines 12 of the two cabin zones 2 and 6. These positioning components can, for example, have an effect upon electric heating and/or a so-called trim air valve. Once again, it is clear that corresponding positioning components are also assigned to the other supply lines 12 and the other cabin zones.

In the example illustrated in FIG. 1, where a temperature sensor 22 is missing in cabin zone 2, there is correspondingly no ambient temperature actual value available for cabin zone 2. Subsequently, no optimum value/actual value comparison can be made either by the evaluation and control unit 24 for cabin zone 2. However, in order to be able to set the ambient temperature in cabin zone 2 to a required target value, an optimum value for the injected temperature (the temperature of injected feed air) is obtained in another way than by optimum value/actual value comparison for ambient temperature. In accordance with one version, the evaluation and control unit 24 determines an optimum value for the injected temperature of cabin zone 2 from the optimum values or the actual values of the injected air temperatures of the other cabin zones 1, 3-6. In accordance with another variation, the evaluation and control unit 24 determines an optimum value for the injected temperature for cabin zone 2 from the temperature measured by means of another temperature sensor 30 (FIG. 1) for the external surrounds of the aircraft 10. The regulation circuit structure shown in FIG. 3 relates to the first variation, whereas the regulation circuit structure shown in FIG. 4 relates to the second variation.

In FIG. 3, the injected temperatures of those cabin zones, the temperature sensors 22 of which provide usable readings, are determined in a block 32. $T_L$ shows here the optimum value and the actual value of the injected temperature. An arithmetical means, for example, can be used as the method for calculation.

The average injection temperature value provided by the block 32 is corrected by two correction values at a summation point 34. A first correction value takes into account an individual temperature reading for cabin zone 2 (or another cabin zone, whereby the regulation method represented by the regulation circuit structure of FIG. 3 should be used). A desired temperature for cabin zone 2 can be set at a temperature selector which is represented in FIG. 3 by a block 36. A block 38 converts the desired temperature set at the temperature selector 36 into a corresponding correction value which is added to the average injection temperature value of block 32. A second correction value is provided by a block 40. The second correction value represents a specific offset value for cabin zone 2. This is pre-determined and stored in the evaluation and control unit 24.

The average injection temperature value corrected by the two correction values establishes the injection temperature optimum value for cabin zone 2. At a difference formation point 42, it is compared with the injection temperature actual value provided by the corresponding temperature sensor 26. In a regulator 44, the difference is converted into a positioning signal for a positioning component 28 assigned to one of the cabin zones 2.

In FIG. 4, the same components, or those with the same effect are identified by the same references as in FIG. 3, however supplemented by small letters. The two regulation circuit structures in FIGS. 3 and 4 are only essentially different from one another in that in FIG. 4, the block 32 of FIG. 3 is replaced by a block 46a which obtains, as an input signal, the external temperature identified by $T_A$ measured by temperature sensor 30. Block 46a determines an injection temperature from the external temperature $T_A$ which is required in order to maintain a specific ambient temperature in cabin zone 2. For this, a corresponding reference field in tabular form is specifically stored in the control and evaluation unit 24. The injected temperature value determined from the external temperature $T_A$ and other optional parameters such as, for example, the flight altitude, is—following correction by a zone-specific offset value and a correction value dependent upon the required ambient temperature in cabin zone 2—used as the optimum value for the injection temperature of cabin zone 2. Moreover, the regulation circuit structure of FIG. 4 corresponds to that of FIG. 3.

The invention makes it possible to provide stable temperature regulation, even when there is no stable reading for ambient temperature in a cabin zone. An individual correction, as is necessary for a pleasant and comfortable ambient atmosphere in a cabin zone, is made possible by the offset value which is taken from the desired temperature set on the temperature selector of the cabin zone in question.

The invention claimed is:

1. Method for the control of the temperature of feed air which is injected into a cabin of a passenger aircraft, whereby the cabin of the aircraft is sub-divided into a plurality of cabin zones which are respectively supplied with specially temperature-controlled feed air, the method comprising, independently controlling the temperature of the feed air injected into each cabin zone dependent upon a deviation of an injection temperature actual value, measured by an injection temperature sensor, of the feed air injected into the respective cabin zone from an injection temperature target value, establishing the injection temperature target value for each of a selected number of the cabin zones, by comparing an ambient temperature actual value, measured by an ambient temperature sensor, for the respective cabin zone with an ambient temperature target value, and establishing the injection temperature target value for at least a first cabin zone not within the selected number of the cabin zones and not having an ambient temperature sensor, based on an injection temperature target value of at least one second cabin zone different from the first cabin zone and an injection air actual temperature of the at least one second cabin zone, whereby the at least one second cabin zone is within the selected number of the cabin zones, and the injection temperature target value for the first cabin zone is established upon the basis of a first correction value which is dependent upon an ambient temperature target value for the first cabin zone, wherein the first correction value can be entered manually.

2. Method in accordance with claim 1, characterised in that the injection temperature target value for the first cabin zone is established upon the basis of the injection temperature target values and the injection temperature actual values ($T_L$) of several, and in particular of all second cabin zones.

3. Method in accordance with claim 2, characterised in that the injection temperature target value for the first cabin zone is established upon the basis of an average value of the injection temperature target values and the injection temperature actual values of several, and in particular all second cabin zones.

4. Method in accordance with claim 1, characterised in that the injection temperature target value for the first cabin zone is also established upon the basis of a second correction value which is constant and based on the physical zone-specific factors of the first cabin zone affecting heat transfer.

5. A passenger aircraft, a cabin of which is sub-divided into a plurality of cabin zones supplied with specially temperature-regulated feed air, including an electronic control unit arranged to independently control, for each cabin zone, the temperature of the injected feed air dependent upon a deviation of an injection temperature actual value, measured by an injection temperature sensor, in relation to an injection temperature target value for the respective cabin zone, wherein the electronic control unit establishes an injection temperature target value for a selected number of the cabin zones by comparing an ambient temperature actual value for each of the selected number of cabin zones, measured by an ambient temperature sensor, with an ambient temperature target value for the respective cabin zone, characterized in that a first cabin zone not within the selected number of the cabin zones does not have an ambient temperature sensor, and the electronic control unit establishes an injection temperature target value for the first cabin zone, upon the basis of (1) an injection temperature target value of at least one second cabin zone different from the first cabin zone, and (2) an injection temperature actual value of at least one second cabin zone different from the first cabin zone, and (3) a first correction value which is dependent upon an ambient temperature target value for the first cabin zone, whereby the at least one second cabin zone is within the selected number of the cabin zones.

* * * * *